Jan. 25, 1966          HIROSHI WATANABE          3,231,834
TELEMETERING CAPSULE FOR PHYSIOLOGICAL MEASUREMENTS
Filed Oct. 5, 1962
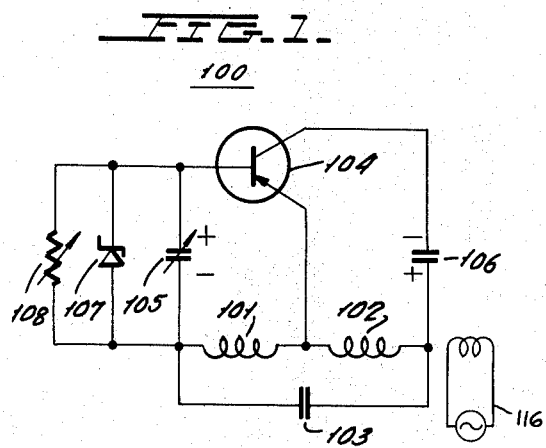
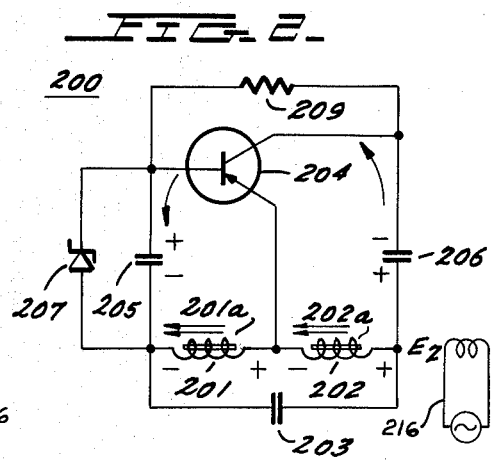
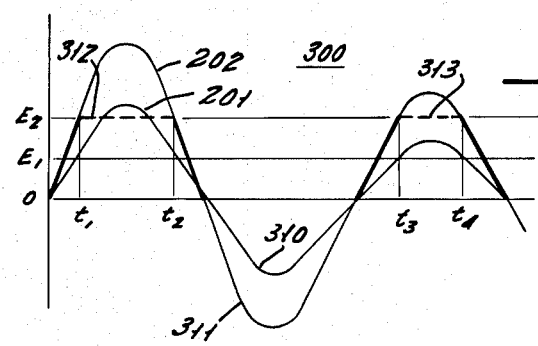
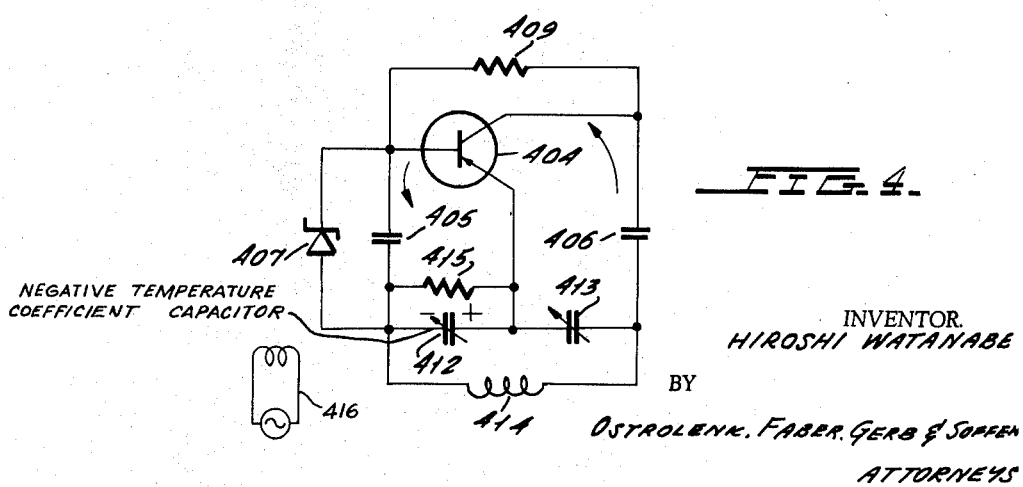
INVENTOR.
HIROSHI WATANABE
BY
OSTROLENK, FABER, GERB & SOFFEN
ATTORNEYS United States Patent Office 3,231,834
Patented Jan. 25, 1966

3,231,834
TELEMETERING CAPSULE FOR PHYSIOLOGICAL MEASUREMENTS
Hiroshi Watanabe, Tokyo, Japan, assignor to Nippon Electric Company Limited, Tokyo, Japan, a corporation of Japan
Filed Oct. 5, 1962, Ser. No. 228,694
Claims priority, application Japan, Oct. 6, 1961, 36/36,360
8 Claims. (Cl. 331—117)

This invention relates to data transmitters and more particularly to data transmitters of extremely small size which are provided with unique oscillating circuit arrangements which function both as the data transmitter voltage source and as the means for identifying the information which is desired to be received from the transmitter location.

Data transmitters which are extremely small in size find widespread use in electromedical research and data transmitters have been employed in this field and have been labeled with the names radio pill, telemetering capsule and intestinalsender, to name just a few. Transmitters of this general type are utilized by having a patient take the transmitter internally so as to obtain data helpful in electromedical research, such as, for example, data concerning gastrointestinal tract activity. Another manner of usage for such compact data transmitters is that of "planting" the transmitter in the patient's muscle, or gland, so as to provide an early diagnosis of a disease.

In operation, the data transmitters receive high frequency electrical energy from an external source which is magnetically coupled to the data transmitter. The high frequency energy is then suitably rectified and stored in a capacitor so that energy stored therein subsequently acts as a power source for the information signal of the compact data transmitter since it does not incorporate its own built-in power supply.

Data transmitters of this general type are designed so that oscillations initiated after elapse of a predetermined time interval, which interval is measured from the instant at which the high frequency excitation magnetic field applied exterior to the human body, is interrupted to the time at which oscillations are initiated. This time interval will hereinafter be identified by the phase oscillation initiation time.

In order that the data transmitter be useful in identifying interior conditions, such as, for example, internal pressure or temperature conditions, at least one or alternatively certain elements of the data transmitter must be made responsive to such internal body conditions. In measuring gastrointestinal pressures, for example, using the oscillation initiation time as the information medium, the following three methods are applicable:

(1) The method of causing a capacitor member of the data transmitter circuit to vary its capacitance value in accordance with the gastrointestinal pressure;

(2) The method of causing the resistance value of a resistor member to vary in accordance with said pressure;

(3) The method of employing a transducer element as part of the data transmitter which converts pressure changes of the above mentioned type into a D.C. voltage which is employed as a control voltage to control the time of initiation of data transmitter oscillation.

Transducers of the type necessary to carry out methods (1) and (2) are extremely difficult to manufacture since the capacitance value of the capacitor must be comparatively large and likewise the resistance value of the resistor must be comparatively large. Transducers of the type necessary to perform method (3) are not readily manufactured since in addition to the requirements of compact size they must also employ a simple, reliable mechanism suitable for the confined surroundings in which they must operate.

The present invention overcomes all of the above disadvantages by being completely adaptable for use with any type transducer mechanism and therefore requires no special purpose transducer.

These functions are performed by employing circuit arrangements in which the oscillation initiation time is altered by varying the inductance of a coil or coils or by varying the capacitance of a condenser or condensers, which elements are only employed as integral components of the data transmitter oscillation circuit. Therefore, such a data transmitter can be used not only for obtaining pressure measurements, but also for obtaining any other kind or quantity of information desired with the only limitation being that the quantities to be measured can be converted into a change in inductance of a coil or coils, or a change in capacitance of a condenser or condensers.

The instant invention is comprised of a transistorized oscillator circuit having means for inductively coupling the oscillatory circuitry to the external excitation source which may, for example, be a high frequency electromagnetic signal. The transistor circuit is connected so as to charge a plurality of charge storing means with predetermined polarities which means are employed to operate as the transmitter energy source. Energy discharge means are provided in the circuitry for enabling discharge of the energy storage means immediately upon the termination of transmission of the excitation source in order to enable oscillation of the transmitter circuitry to be initiated at a predetermined time. The interval between termination of transmission of the excitation energy source and initiation of oscillation of the transmitter means is thereby employed as the information means by which pressure, temperature and other changes to be measured within the human body are transmitted to an external receiving source which may be any suitable receiver means capable of receiving electromagnetic high frequency signals. Means are provided for interconnecting the energy storing means so as to make the oscillation initiation time dependent upon all of the energy storage means which are so connected. Since the energy storage means are dependent upon the values of the receiving means which are employed to receive the high frequency energy from the external source, then the variance in impedance of these variable impedance receiver members become determinative of the oscillation initiation time as one embodiment by employing inductor members having movable iron cores. These movable core members may be employed to react to pressure and temperature changes so as to accurately control the oscillation initiation time. Another embodiment is comprised of providing capacitive members employed in parallel with the receiving means having suitable temperature coefficients of capacity which vary in accordance with local temperatures so as to provide an accurate indication of temperature conditions within the region being monitored. As a third possibility, the capacitor elements may be employed for transducer elements, such as, for example, piezoelectric elements which react to pressure conditions to alter the capacitance value of the capacitor members thereby controlling the oscillation initiation time in order to provide information regarding pressure conditions in the area being monitored.

It is therefore one object of this invention to provide an information transmitter which is so designed as to be readily applicable for use in an extremely confined space.

Still another object of this invention is to provide a data transmitter having a unique oscillating circuit which is responsive to pressure changes in order to control oscillation initiation time of the data transmitter.

Another object of this invention is to provide a data transmitter having variable impedance elements responsive to pressure and/or temperature conditions in the local of operation for controlling the oscillation initiation time of the data transmitter means.

Still another object of this invention is to provide a data transmitter for use in extremely confined regions which is so designed as to cause the transmitter energy source voltages to be controlled by the data transmitter variable impedance members.

These and other objects of this invention will become apparent when reading the accompanying description and drawings in which:

FIGURE 1 shows a circuit diagram showing a data transmitter and an excitation source of the prior art.

FIGURE 2 shows a schematic diagram of a data transmitter and an excitation source designed in accordance with the principles of the instant invention.

FIGURE 3 shows a plurality of waveforms useful in the description of operation of the data transmitter of FIGURE 2.

FIGURE 4 shows a circuit diagram of an alternative embodiment for the data transmitter and an excitation source of FIGURE 2.

Referring now to the drawings;

FIGURE 1 shows a data transmitter 100 of the type known to the prior-art, which is comprised of a tank circuit consisting of inductors 101 and 102 and a capacitor 103. A base capacitor 105 is provided which is connected between the base electrode of transistor 104 and the common terminal, between inductor 101 and capacitor 103. A Zener diode 107 and a resistance member 108 are connected in parallel across capacitor 105. A common terminal shared between inductor 102 and capacitor 103 has one terminal of capacitor 106 connected thereto, whereas the opposite terminal is connected to the collector electrode of transistor 104.

By placing the data transmitter 100 in a high frequency magnetic field generated by any suitable exterior excitation source such as the source 116, a high frequency voltage is induced in the tank circuit, comprised of coils 101, 102 and capacitor 103, while capacitors 105 and 106 become charged such that their polarities are shown by the signs of FIGURE 1 due to the rectifying action of transistor 104.

The voltage charge across the condenser 105 is maintained at a constant level by the Zener diode 107. When the high frequency magnetic field applied from the external excitation source is terminated, the charge on the condenser 105 is discharged through transistor 104 and resistor 108 with the result that the voltage across capacitor 105 begins to diminish. This causes transistor 104 to shift from cut-off to conduction condition, thereby causing the data transmission oscillation circuit to begin its oscillation. The oscillation initiation time is determined by the time constant of the circuit elements through which the base condenser discharges. As previously described, in measuring gastrointestinal pressures, for example, with this oscillation initiation time as the information medium, the capacitor 105 may have its capacitance vary in accordance with the gastrointestinal pressure. The second method is that of having the resistance value of resistor 108 vary in accordance with said pressure and a third possibility is the provision of a transducer which develops a voltage proportional to the gastrointestinal pressures which biases the base electrode of transistor 104 in such a manner as to control the oscillation initiation time. As each of these three methods require rather complicated and expensive variable impedance (or variable voltage) elements, it can be seen that the prior-art arrangement has decided disadvantages.

One embodiment of the present invention is shown in FIGURE 2 and is comprised of a Hartley-type oscillator circuit comprising a single transistor 204. First and second coils, or inductors, 201 and 202, have a common terminal connected to the emitter electrode of transistor 204 and have a capacitor 203 connected across their outer terminals. The capacitor 205 and a Zener diode 207 are connected in parallel between the base electrode of transistor 204 and the common terminal between inductor 201 and capacitor 203. A third capacitor 206 is connected between the collector electrode of transistor 204 and the common terminal between inductor 202 and capacitor 203. A resistance member 209 is provided and is connected between the collector and base electrode of transistor 204. While a description will be given of a case in which electromagnetic coupling exists between coils 201 and 202, nevertheless, the operation of the circuit will be substantially the same, even in the absence of this magnetic coupling which operation is as follows:

When a high frequency sinusoidally varying magnetic field is applied to the data transmitter from an externally located source 216, an H-F voltage is induced in the tank circuit comprised of coils 201 and 202 and capacitor 203, and due to the rectifying action of transistor 204 the base capacitor 205 and the collector capacitor 206 become charged with the polarity as shown in FIGURE 2. Where the high frequency voltage induced in the tank circuit is appreciably high the charging voltage of the base capacitor 205 becomes suppressed to a constant value by employment of the Zener diode members 207 which is connected in shunt with capacitor 205. If the instantaneous value of the voltage across the tank coil 201 has a polarity as illustrated in FIGURE 2, and when the voltage across coil 201 becomes greater than the voltage across the base capacitor 205, the junction between the base and the emitter of transistor 204 becomes conductive and a current flows. However, under conditions in which no current flows, the ratio of the voltage across coil 201 to that across coil 202 is equal to the ratio of inductances of the two coils and the two voltages across these coils are in phase with one another. During the interval in which the aforementioned current flows across the base-emitter junction of transistor 204 the losses of the tank circuit increase abruptly. At this instant of time the voltage across coil 202 fails to increase with the result that the voltage across coil 202 is maintained at a value which is determined by the inductance ratio of coils 201 and 202 and the voltage of the Zener diode 207. Thus the charging voltage of the collector capacitor 206 becomes a constant value irrespective of the amplitude of the high frequency magnetic field on the external source 216, provided that the field intensity is sufficiently large.

Referring to FIGURE 3, a plot 300 is shown therein providing the instantaneous voltage versus time curves 310 and 311 wherein the abscissa and the ordinant of plot 300 represent time and voltage, respectively. Curve 310 denotes a high frequency voltage waveform showing the instantaneous voltage across the coil 201, while the curve 311 shows the high frequency voltage across the coil 202. The dotted curve portions 312 and 313 represent the surpressed voltage of the terminals of coil 202. During the time interval from $t_1$ to $t_2$ transistor 204 is in a state of conduction and it can be seen by curve portion 312 that the voltage across inductor 202 remains at a constant voltage level $E_2$ during this conduction period.

When the external excitation source 216, which has been generating the excitation electromagnetic field pattern is interrupted, the base capacitor 205 begins to discharge and after lapse of a certain time interval the data transmitter circuit 200 initiates oscillation since one terminal of capacitor 205 and one terminal of capacitor 206 are connected to the opposite terminals, respectively, of the resistor 209. The oscillation initiation time is also effected by the voltage across the collector capacitor 206 due to the common discharge resistor 209 which these capacitors share. Since the voltage of the collector capacitor 206 varies in accordance with the variances in the inductance ratio of coils 201 and 202 the oscillation initiation time is varied in accordance with a change in inductance. If the inductances of either coil 201 or 202, or both, are changed, therefore by employment of movable iron cores, such as the cores 201a and 202a, positioned within the magnetic fields of the coils 201 and 202, respectively, and by causing the positions of these iron cores to change with pressure changes, a data transmitter for the measurement of pressure for medical use is available. In a similar manner, any other kind or type of information, other than pressure information, is obtainable. Thus it can be seen that the fluctuating position changes of the iron cores 201a and 202a, or either one, independently vary the inductances ratio between the coils 201 and 202 thereby effecting the voltage charge which will be developed across the collector capacitor 206, as described above.

FIGURE 4 shows an alternative embodiment 400 for the data transmitter 200 of FIGURE 2, which embodiment employs a Colpitts type oscillator circuit. The arrangement of FIGURE 4 distinguishes from that of FIGURE 2 in that the capacitor 203 is replaced by an inductor 414 and the inductors 201 and 202 are replaced by capacitor members 412 and 413. In addition thereto, resistive member 415 is used for D.C. biasing of the circuitry, as will be more fully described.

Upon application of a high frequency magnetic field from the external excitation source 416, the high frequency voltage is induced in the tank circuit comprised of condensers 412 and 413 and inductor 414. If the instantaneous value of the voltage developed across condenser 412, has a polarity as shown in FIGURE 4 and when the voltage across capacitor 412 exceeds the Zener, or breakdown voltage, of the Zener diode member 407, a current flows through the emitter of transistor 404 and the voltage across capacitor 413 is suppressed so as to maintain a constant value thereacross causing the voltage level of the charge across collector capacitor 406 to achieve a constant voltage value the level of which is determined by the ratio of the capacitance of capacitor 412 to the capacitance of capacitor 413, as will easily be surmised from the description supplied previously. Therefore, the oscillation initiation time in the circuit of FIGURE 4 can be varied by changing the capacitance of either condenser 412 or 413, or by changing the capacitance of both of these elements.

Since the capacitance of both condensers 412 and 413 can be selected to be smaller than the capacitance of the base condenser 405 this permits the construction of a data transmitter employing this method which is substantially easier to manufacture than the type which controls oscillation initiation by changing the capacitance value of the base condenser directly. The reason for this is that the discharge rate of the capacitor 405 is determined and controlled, as explained above, by the ratio of the capacitance value of the condensers 412 and 413. By employing a capacitor which has a zero temperature coefficient for the capacitive member 412 and a capacitor which has a negative temperature coefficient for the capacitive member 413 then if the ambient temperature rises the ratio of the two capacitors C412/C413 increases and therefore the charging voltage increases and in this way the temperature coefficient of the oscillation initiation time assumes a positive value. If, as an alternative, the condenser 412 is made to have a negative temperature coefficient and the capacitor 413 is made to have a zero temperature coefficient, the temperature coefficient of the oscillation initiation time assumes a negative value. By selecting the temperature coefficients of the two capacitors 412 and 413 in any of the above appropriate manners, the temperature coefficient of the oscillation initiation time can be made to remain substantially constant even if the other components of the data transmitter have become effected by temperature changes. Capacitors having such temperature coefficients may be obtained by the employment of dielectric materials exhibiting such temperature coefficients, or by any other well known method.

The above descriptions hold true in the case of the Hartley oscillator circuit 200, shown in FIGURE 2, by substituting the capacitor 412 or 413 with the coils 201 and 202 in the above explanation.

It can be seen from the above descriptions that the transformer coupled oscillator circuit may control the oscillation initiation time by the adjustment of either the self-inductance of the primary winding of the transformer which may be considered to be the winding 201, or the self-inductance of the secondary winding which may be considered to be the winding 202 or by changing the value of the mutual inductance of the windings 201 and 202 in FIGURE 2 (assuming therefore that at least some mutual inductance is provided for between the windings 201 and 202 so as to produce a transformer type action between these two windings). It should also be further understood that the transistor 204, or 404, employed in the data transmitter 200, or 400, respectively, may be replaced by any other suitable three-terminal element.

Although there has been described a preferred embodiment of this novel invention, many variations an modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a data transmitter of the type comprising tank circuit means consisting of at least one capacitor means and at least one inductor means being connected in parallel for receiving a high frequency magnetic field applied from an external location so as to avoid incorporating a built-in power supply source for said data transmitter, means for rectifying the received energy; means for storing said rectified energy for initiation of oscillation after the elapse of a predetermined time interval measured from the instant at which the high frequency magnetic field is interrupted; means for controlling the charging voltage value of said storage means to thereby place the charging voltage of the storage means under control of the inductance of said tank circuit to thereby vary the oscillation initiation time; said means for storing said rectified energy being a capacitor, said rectifying means being a transistor having emitter, base and collector electrodes, said storing capacitor being connected across the base and emitter electrodes of said transistor; said means for placing said storage capacitor under control of said tank circuit inductance being comprised of a second capacitor connected between the collector electrode of said transistor and one terminal of said tank circuit; and a resistive member connecting one terminal of said second capacitor to one terminal of said storing capacitor and being connected between said collector and base electrodes; said tank circuit inductor means comprising first and second series connected inductors, the common terminal between said first and second inductors being coupled to the emitter of said transistor; the initiation of oscillation being determined by the ratio of the values of said first and second inductors.

2. In a data transmitter of the type comprising tank circuit means consisting of at least one capacitor means and at least one inductor means being connected in parallel for receiving a high frequency magnetic field applied from the external location so as to avoid incorporating a built-in power supply source for said data transmitter, means for rectifying the received energy; means for storing said rectified energy for initiation of oscillation after the elapse of a predetermined time interval measured from the instant at which the said high frequency magnetic field is interrupted; means for placing the charging voltage value of said storage means under the control of the capacitance value of said tank circuit capacitance to thereby vary the oscillation initiation time; said rectifying means being a transistor having emitter, base and collector electrodes, said storage means being a capacitor having a first terminal connected to the base electrode of said transistor; said means for placing said storing means under control of said tank circuit capacitance being comprised of a second capacitor member connected to one terminal of said tank circuit and having a second terminal connected to the collector electrode of said transistor means; and a resistive member connecting said collector electrode of said transistor means to the base electrode of said transistor means; said tank circuit capacitor means being comprised of first and second series connected capacitors with the common terminal between the capacitors being coupled to the emitter of said transistor; the initiation of oscillation being determined by the ratio of the values of said first and second series connected capacitors.

3. In a data transmitter of the type comprising a tank circuit means consisting of at least one capacitor means and at least one inductor means being connected in parallel for receiving a high frequency magnetic field applied from an external location so as to avoid incorporating a built-in power supply source for said data transmitter, means for rectifying the received energy; means for storing said rectified energy for iintiation of oscillation after the elapse of a predetermined time interval measured from the instant at which the high frequency magnetic field is interrupted; means for controlling the charging voltage value of said storage means to thereby place the charging voltage of the storage means under control of the inductance of said tank circuit to thereby vary the oscillation initiation time; said means for storing said rectified energy being a capacitor, said rectifying means being a transistor having emitter, base and collector electrodes, said storing capacitor being connected across the base and emitter electrodes of said transistor; said means for placing said storage capacitor under control of said tank circuit inductance being comprised of a second capacitor connected between the collecter electrode of said transistor and one terminal of said tank circuit; and a resistive member connecting one terminal of said second capacitor to one terminal of said storing capacitor; said tank circuit inductor means being comprised of first and second series connected inductors with the common terminal between the inductors being coupled to the emitter of said transistor; the initiation of oscillation being determined by the ratio of the values of said first and second inductors; the inductor of said tank circuit having a movable core member responsive to ambient pressure conditions to alter the inductance of said tank circuit inductor means.

4. In a data transmitter of the type comprising tank circuit means consisting of at least one capacitor means and at least one inductor means being connected in parallel for receiving a high frequency magnetic field applied from the external location so as to avoid incorporating a built-in power supply source for said data transmitter, means for rectifying the received energy; means for storing said rectified energy for initiation of oscillation after the elapse of a predetermined time interval measured from the instant at which the said high frequency magnetic field is interrupted; means for placing the charging voltage value of said storage means under the control of the capacitance value of said tank circuit capacitance to thereby vary the oscillation initiation time; said rectifying means being a transistor having emitter, base and collector electrodes, said storage means being a capacitor having a first terminal connected to the base electrode of said transistor; said means for placing said storing means under control of said tank circuit capacitance being comprised of a second capacitor member connected to one terminal of said tank circuit and having a second terminal connected to the collector electrode of said transistor means; said tank circuit capacitor means being comprised of first and second series connected capacitors with the common terminal between the capacitors being coupled to the emitter of said transistor; the initiation of oscillation being determined by the ratios of the values of said first and second series connected capacitors; the capacitive member of said tank circuit having a negative temperature coefficient for varying the capacitance value of said capacitor member to control the oscillation initiation time of said data transmitter.

5. A data transmitter excited from an external source comprising first and second inductance means having preselected inductance values and being connected in series and a tuning capacitor connected in parallel across said series connected inductance means for receiving a high frequency magnetic field applied from an external location; transistor means having base, emitter and collector electrodes for rectifying the received energy and for generating oscillating signals; a first storing capacitor connected between the base electrode of said transistor and said tuning capacitor; a second storing capacitor connected between the collector electrode of said transistor and said tuning capacitor avoiding the need for incorporating a built-in power source for said data transmitter; the common terminal between said first and second inductance means being coupled to said emitter electrode; the charging voltage value of said second storing capacitor being under control of the inductance ratio of said inductance means; resistor means connecting one terminal of said first storing capacitor to one terminal of said second storing capacitor; the ratios of values of said first and second inductance means being selected to vary the oscillation initiation time.

6. A data transmitter excited from an external source comprising first and second capacitors having predetermined capacitance values and being connected in series, and a tuning coil connected in parallel across said series connected capacitors for receiving a high frequency magnetic field applied from an external location; transistor means having base, emitter and collector electrodes for rectifying the received energy and for generating oscillating signals; a first storing capacitor connected between the base electrode of said transistor and said tuning coil; a second storing capacitor connected between the collector electrode of said transistor and said tuning coil avoiding the need for incorporating a built-in power source for said data transmitter; the common terminal between said series connected capacitors being connected to said emitter electrode; the charging voltage value of said second storing capacitor being under control of the capacitance ratio of said first and second capacitors; resistor means connecting one terminal of said first storing capacitor to one terminal of said second storing capacitor; the ratios of values of said first and second series connected capacitors being selected to vary the oscillation initiation time.

7. A data transmitter excited from an external source comprising first and second inductance means having preselected inductance values and being connected in series and a tuning capacitor connected in parallel across said series connected inductance means for receiving a high frequency magnetic field applied from an external location; transistor means having base, emitter and collector electrodes for rectifying the received energy and for generating oscillating signals; a first storing capacitor connected between the base electrode of said transistor and said tuning capacitor; a second storing capacitor connected between the collector electrode of said transistor and said tuning capacitor avoiding the need for incorporating a built-in power source for said data transmitter; the common terminal between said first and second inductance means being coupled to said emitter electrode; the charging voltage value of said second storing capacitor being under control of the inductance ratio of said inductance means; resistor means connecting one terminal of said first storing capacitor to one terminal of said second storing capacitor; the ratios of values of said and second inductance means being selected to vary the oscillation initiation time; at least one of said inductance means having a movable core member responsive to ambient pressure conditions to alter the inductance of said inductance means.

8. A data transmitter excited from an external source comprising first and second capacitors having predetermined capacitance values and being connected in series, and a tuning coil connected in parallel across said series connected capacitors for receiving a high frequency magnetic field applied from an external location; transistor means having base, emitter and collector electrodes for rectifying the received energy and for generating oscillating signals; a first storing capacitor connected between the base electrode of said transistor and said tuning core; a second storing capacitor connected between the collector electrode of said transistor and said tuning coil avoiding the need for incorporating a built-in power source for said data transmitter; the common terminal between said series connected capacitors being connected to said emitter electrode; the charging voltage value of said second storing capacitor being under control of the capacitance ratio of said first and second capacitors; resistor means connecting one terminal of said first storing capacitor to one terminal of said second storing capacitor; the ratios of values of said first and second series connected capacitors being selected to vary the oscillation initiation time; at least one of said first and second capacitors including means having a temperature coefficient responsive to ambient temperature conditions to control the oscillation initiation time of said data transmitter.

No references cited.

ROY LAKE, *Primary Examiner.*

JOHN KOMINSKI, *Examiner.*